United States Patent [19]

Landa

[11] Patent Number: 5,146,276
[45] Date of Patent: Sep. 8, 1992

[54] ROTATABLE FOCUSING MEANS AND VARIABLE MAGNIFICATION ELECTROPHOTOCOPIER

[75] Inventor: Benzion Landa, Edmonton, Canada

[73] Assignee: Spectrum Sciences B.V., Wassenaar, Netherlands

[21] Appl. No.: 122,530

[22] Filed: Nov. 19, 1987

Related U.S. Application Data

[63] Continuation of Ser. No. 398,841, Jul. 16, 1982, abandoned, which is a continuation-in-part of Ser. No. 205,638, Nov. 10, 1980, abandoned, which is a continuation of Ser. No. 959,303, Nov. 9, 1978, abandoned.

[51] Int. Cl.$^5$ .................. G03G 15/04; G03B 27/48; G03B 27/70
[52] U.S. Cl. ........................................ 355/243; 355/57
[58] Field of Search ................. 355/3 R, 8, 11, 56, 355/57, 60, 243

[56] References Cited

U.S. PATENT DOCUMENTS

| | | | |
|---|---|---|---|
| 3,572,924 | 3/1971 | Matsumoto et al. | 355/57 X |
| 3,614,222 | 10/1971 | Post et al. | 355/8 |
| 3,876,302 | 4/1975 | Todt | 355/8 X |
| 3,999,850 | 12/1976 | Komori et al. | 355/8 |
| 4,013,361 | 3/1977 | Allis | 355/8 X |
| 4,029,409 | 6/1977 | Spinelli et al. | 355/11 X |
| 4,033,692 | 7/1977 | O'Connell | 355/14 |
| 4,060,324 | 11/1977 | Wakatsuki | 355/601 |
| 4,116,562 | 9/1978 | Libby et al. | 355/60 |
| 4,118,118 | 10/1978 | Barto | 355/8 |
| 4,129,379 | 12/1978 | Ogrisek et al. | 355/57 |

FOREIGN PATENT DOCUMENTS

| | | |
|---|---|---|
| 698171 | 10/1953 | United Kingdom . |
| 902909 | 8/1962 | United Kingdom . |
| 1437892 | 6/1976 | United Kingdom . |
| 1512838 | 6/1978 | United Kingdom . |
| 1527860 | 10/1978 | United Kingdom . |
| 1538492 | 1/1979 | United Kingdom . |

OTHER PUBLICATIONS

Day, Pierce B; "Size Reduction Imaging Means"; Research Disclosure, Aug. 1976, p. 12, No. 14820.
IBM Technical Disclosure Bulletin, vol. 15, No. 4 (Sep. 1972), pp. 1366 and 1367 "Two-Mirror Copier Scanner".

Primary Examiner—Fred L. Braun
Attorney, Agent, or Firm—Kenyon & Kenyon

[57] ABSTRACT

A variable magnification electrophotographic copier wherein the ratio of object and image distances is changed by rotating a focusing device about an axis orthogonal to its optical axis. In a preferred embodiment, the focusing device is a refractive lens having a shape factor different from zero; the rotational axis intersects the optical axis; and the rotation angle is 180° selectively to reverse the lens surfaces and provide images of two different magnifications each having minimum spherical aberration.

10 Claims, 5 Drawing Sheets

ROTATABLE FOCUSING MEANS AND VARIABLE MAGNIFICATION ELECTROPHOTOCOPIER

BACKGROUND OF THE INVENTION

This application is a continuation of application Ser. No. 06/398,841, filed Jul. 16, 1982, now abandoned, which in turn is a continuation-in-part of my copending application Ser. No. 205,638 filed Nov. 10, 1980 which is a continuation of my application Ser. No. 959,303 filed Nov. 9, 1978, now abandoned.

My invention relates to electrophotographic copiers and, more particularly, to variable magnification electrophotographic copiers using movable focusing means.

In electrophotographic copiers of the prior art movable focusing means are used to vary the magnification of the light image focused upon a photoconductive surface. However, the focusing means is translated along its optical axis, in a same manner as the lens of a camera. To produce this translational movement of the focusing means is mechanically complex and expensive in view of the precision with which it must be accomplished to achieve accurate focus at various magnifications. In my invention, variable magnification is obtained by rotating the focusing means about an axis orthogonal to its optical axis, resulting in a mechanically simpler, more accurate, and less expensive construction.

The problem of changing magnification in an electrophotographic copier is particularly difficult in copiers having focusing means of fixed focal length. In such copiers a change of magnification requires not only a change in the ratio of the object distance to the image distance but also a change in the sum of the object and image distances.

SUMMARY OF THE INVENTION

One object of my invention is to provide a variable magnification electrophotographic copier having focusing means which rotates about an axis orthogonal to its optical axis.

Another object of my invention is to provide a variable magnification electrophotographic copier which is mechanically simple and inexpensive.

Other and further objects of my invention will appear from the following description.

In general my invention contemplates a focusing means for electrophotographic copiers which rotates about an axis orthogonal to its optical axis. In a preferred embodiment of my invention, the focusing means is a reflex lens of fixed focal length and having first and second refractive surfaces. The lens focuses light from an object, such as an original document, onto a charged photoconductive surface to produce a latent electrostatic image which is developed and transferred to copy paper, as is well-known to the art. By rotating a lens about an axis orthogonal to and displaced from its optical axis, the ratio of the object distance to the image distance is readily varied. Mirrors positioned either between the original object and the lens, or between the lens and the photoconductive image surface, or between the lens and both the object and the image may be moved to vary the sum of the object and image distances.

BRIEF DESCRIPTION OF THE DRAWINGS

In the accompanying drawings which form part of the instant specification and which are to be read in conjunction therewith and in which like reference numerals are used to indicate like parts in the various views.

DESCRIPTION OF THE PREFERRED EMBODIMENT

Figure 1:
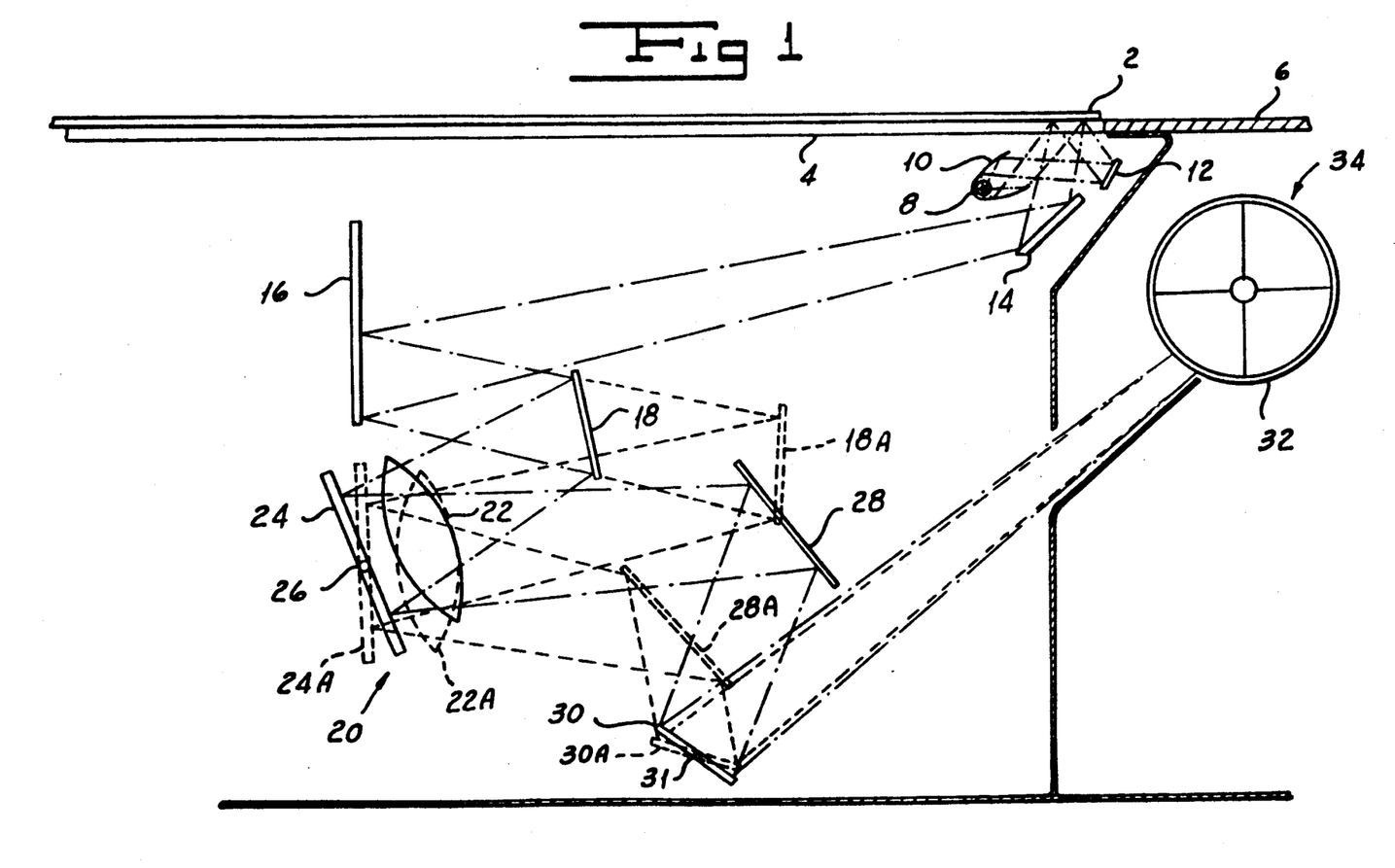
FIG. 1 is a fragmentary side elevation of a first embodiment of my invention showing the optical paths for different magnifications.
Figure 2:
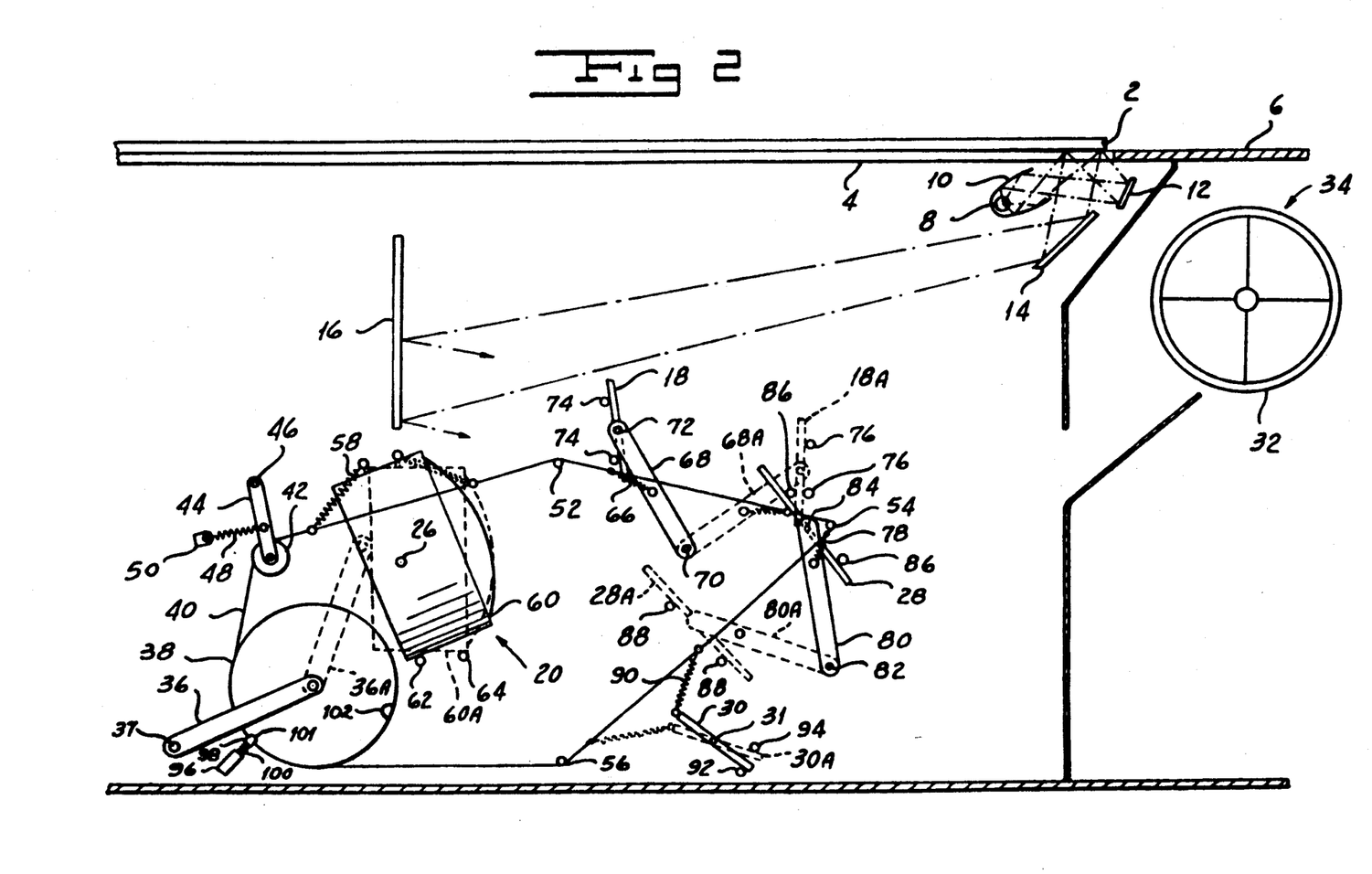
FIG. 2 is a side elevation of the first embodiment showing the details of mechanism for driving the various optical elements.
Figure 3:
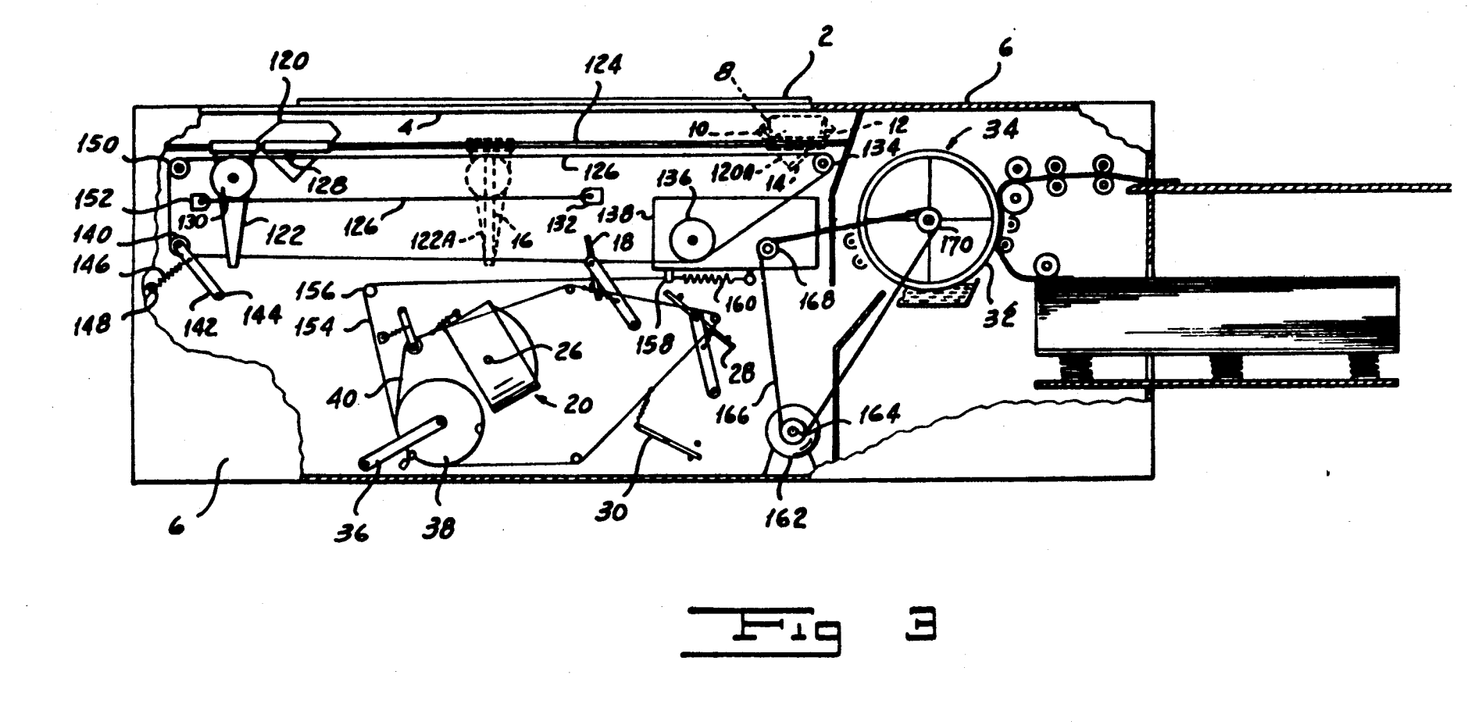
FIG. 3 is a side elevation of an electrophotographic copier employing the first embodiment of FIGS. 1 and 2.

FIGS. 1 through 3 show the first embodiment of my invention. An object document 2 to be copied is placed upon transparent platen 4, which is mounted in the top of housing 6 of an electrophotographic copier. Light from lamp 8 is reflected by a semi-elliptical reflector 10 and a planar mirror 12 to illuminate a lateral strip of the document. Light from the illuminated strip of document 2 is directed to a reflex lens 20 after sequential reflection from transfer optics comprising full-rate scanning mirror 14, half-rate scanning mirror 16, and a mirror 18. Reflex lens 20 includes a double convex lens 22 and a planar mirror 24, and is mounted on shaft 26 for rotation about an axis which orthogonally intersects the optical axis of lens 20. Light from reflex lens 20 is focused upon a charged photoconductive surface 32 after sequential reflection from transfer optic comprising mirrors 28 and 30. The photoconductive layer 32 is mounted on a drum 34.

The magnification of the image formed by reflex lens 20 upon surface 32 is equal to the ratio of the image distance to the object distance. For a magnification of unity, the image on the photoconductive surface is the same size as the document; and the object and image distances from the lens are equal. If the image is to be smaller than the object document 2, so that the magnification is less than unity, then the object distance must be increased and the image distance decreased. This reduction in magnification is made by moving mirror 18 to the alternate position 18A, by rotating reflex lens 20 so that its lens and mirror are in the alternate positions 22A and 24A, by moving mirror 28 to the alternate position 28A, and by rotating mirror 30 on its shaft 31 to the alternate position 30A.

As shown in FIG. 2, a magnification-changing crank 36 provided with a crank handle 37 is attached to a rotatable drum 38, about which flexible cable 40 is wrapped. Cable 40 passes over tensioning pulley 42, which is mounted on a lever 44 journalled on a fixed shaft 46. Lever 44 is biased by spring 48 toward spring anchorage 50 to take up slack in cable 40. Cable 40 further passes over pulleys 52, 54, and 56 before being returned to drum 38.

One end of spring 58 is attached to cable 40, and the other is secured to a housing 60, in which reflex lens 20 is mounted. Beneath housing 60 are fixed stops 62 and 64. Stop 62 limits counterclockwise rotation of housing 60 to the angular orientation for unity magnification; and stop 64 limits clockwise rotation of housing 60 to the alternate angular orientation 60A for reduced magnification.

One end of spring 66 is attached to cable 40, and the other is secured to a lever 68, journalled at one end on a shaft 70. The other end of lever 68 rotatably mounts a shaft 72 to which is secured mirror 18. Stops 74 limit counterclockwise rotation of lever 68 and hold mirror 18 in the position and angle for unity magnification. Stops 76 limit clockwise rotation of lever 68 and hold mirror 18 in the alternate position and angle 18A for reduced magnification.

One end of spring 78 is attached to cable 40, and the other is secured to a lever 80, journalled at one end on a fixed shaft 82. The other end of lever 80 rotatably mounts a shaft 84 to which is secured mirror 28. Stops 86 limit clockwise rotation of lever 80 and hold mirror 28 in the position and angle for unity magnification. Stops 88 limit counterclockwise rotation of lever 80 and hold mirror 28 in the alternate position and angle 28A for reduced magnification.

One end of spring 90 is attached to cable 40, and the other is secured to mirror 30. Stop 92 limits clockwise rotation of mirror 30 to the angular orientation for unity magnification. Stop 94 limits counterclockwise rotation of mirror 30 to the alternate angular orientation 30A for reduced magnification.

When magnification-changing crank 36 is in the position shown in FIG. 2, the optical system produces unity magnification. Cable 40 is moved counterclockwise along its path, thus moving the attached ends of springs 58, 66, 78, and 90 to the positions shown. Spring 58 biases housing 60 against stop 62; spring 66 biases mirror 18 against stops 74; spring 78 biases mirror 28 against stops 86; and spring 90 biases mirror 30 against stop 92. Thus, the optical elements of the system are in the proper position for unity magnification. Crank 36 is maintained in the position shown by a detenting member 98 which cooperates with a first detent 101 in the surface of drum 38. Member 98 is provided with a hemispherical head secured to a shaft which telescopes within a fixed casing 96, and is biased toward engagement with the drum by a coil spring 100.

A reduction in magnification is obtained by rotating crank 36 clockwise to the alternate position 36A. Sufficient manual force must be initially applied to crank handle 37 to cause head 98 to ride out of detent 101 to the surface of drum 38 against the biasing force of spring 100. Thereafter the crank 36 may be easily rotated to its alternate position 36A, where spring 100 forces head 98 into a second detent 102 in the surface of drum 38, to maintain the crank in the alternate position. Cable 40 is moved clockwise along its path, thus moving springs 58, 66, 78, and 90 to the alternate positions shown in FIG. 2. Spring 58 now biases housing 60 to the alternate angular orientation 60A against stop 64; spring 66 now biases mirror 18 to the alternate position and angle 18A against stops 76; spring 78 now biases mirror 28 to the alternate position and angle 28A against stops 88; and spring 90 now biases mirror 30 to the alternate angular orientation 30A against stop 94. All of the optical elements are now in the proper position for reduced magnification.

Referring now to FIG. 3, lamp 8, reflector 10, illuminating mirror 12, and scanning mirror 14 are all mounted on a full-rate carriage 120. Mirror 16 is mounted on a half-rate carriage 122. Both the full and half-rate carriages ride upon laterally spaced rails 124 (only one of which is shown). Full-rate carriage 120 and half-rate carriage 122 each move between the positions shown and the alternate positions 120A and 122A.

Carriages 120 and 122 are moved by a flexible cable 126. Cable 126 is attached to a fixed anchorage 132. Cable 126 passes half-way around one groove of a two-groove sheave 130, which is rotatably mounted on the half-rate carriage 122, and is then secured to full-rate carriage 120 by clamp 128. From clamp 128, cable 126 passes over pulley 134 to drum 136, which is mounted upon the output shaft of a two-speed transmission 138. Cable 126 is wound around drum 136 and then passes over tensioning pulley 140, journalled at one end of lever 142. The other end of lever 142 is journalled on a fixed shaft 144. Lever 142 is biased by a spring 146 attached to anchorage 148. Cable 126 then passes over pulley 150, passes half-way around the other groove of sheave 130, and is attached to a fixed anchorage 152.

The portion of cable 126 from clamp 128 to sheave 130 is parallel to the portion of cable from sheave 130 to anchorage 132. Since cable 126 is fixedly attached to both clamp 128 and anchorage 132, the sum of the lengths of these two cable portions is constant When carriage 122 moves toward anchorage 132, the length of cable from sheave 130 to anchorage 132 decreases, while the length of cable from sheave 130 to clamp 128 increases. The movement of clamp 128 is the sum of the movement of clamp 128 relative to sheave 130 and the movement of carriage 122. Thus, carriage 120 moves twice as fast as carriage 122.

As the full-rate carriage moves from position 120A to the position 120 shown in solid lines, the half-rate carriage moves from position 122A to the position 122 shown in solid lines. Movement of carriage 120 to the right increases the object distance by the amount of such movement. Movement of carriage 122 to the right decreases the object distance by twice the amount of such movement. Since carriage 120 moves at twice the rate of carriage 122, the object distance remains constant; and scanning of document 2 does not alter the focus of the image upon surface 32.

As mirror 14 scans the object field of document 2, the image field upon photoconductive surface 32 likewise moves. To prevent blurring of the image, surface 32 must move at a velocity which is equal to the product of the scanning speed of mirror 14 and the magnification of the image focussd upon surface 32.

FIG. 3 shows a mechanism for synchronizing the motion of photoconductive surface 32 with that of scanning mirror 14 at two different magnifications. Motor 162 rotates a sprocket 164 which drives a chain 166. Chain 166 rotates a first sprocket 168 mounted on an input shaft of two-speed transmission 138 and a second sprocket 170 mounted on the supporting shaft of drum 34. Rotation of sprocket 168 causes transmission 138 to rotate drum 136. This moves cable 126 and causes the full-rate and half-rate carriages to scan document 2. Rotation of sprocket 170 causes drum 34 to rotate, moving photoconductive surface 32 in synchronism with carriage 120.

Also wound partially around drum 38 and attached thereto is a cable 154. Cable 154 passes over pulley 156 to a gear shifting lever 158 of two-speed transmission 138. With crank 36 in the position shown cable 154 maintains gear shift lever 158 in the position shown, which provides the proper gear ratio for unity magnification. With this gear ratio, the peripheral velocity of the photoconductive surface 32 of drum 34 is equal to the velocity of carriage 120. When crank 36 is rotated clockwise to the position 36A shown in FIG. 2, cable 154 unwinds from drum 38, permitting spring 160 to pull shift lever 158 to the right and set transmission 138 to the proper gear ratio for reduced magnification. If the reduced magnification is one-half, for example, then the gear ratio must be doubled to ensure that carriage 120 moves at a velocity which is twice that of the peripheral surface 32 of drum 34.

Figure 4:
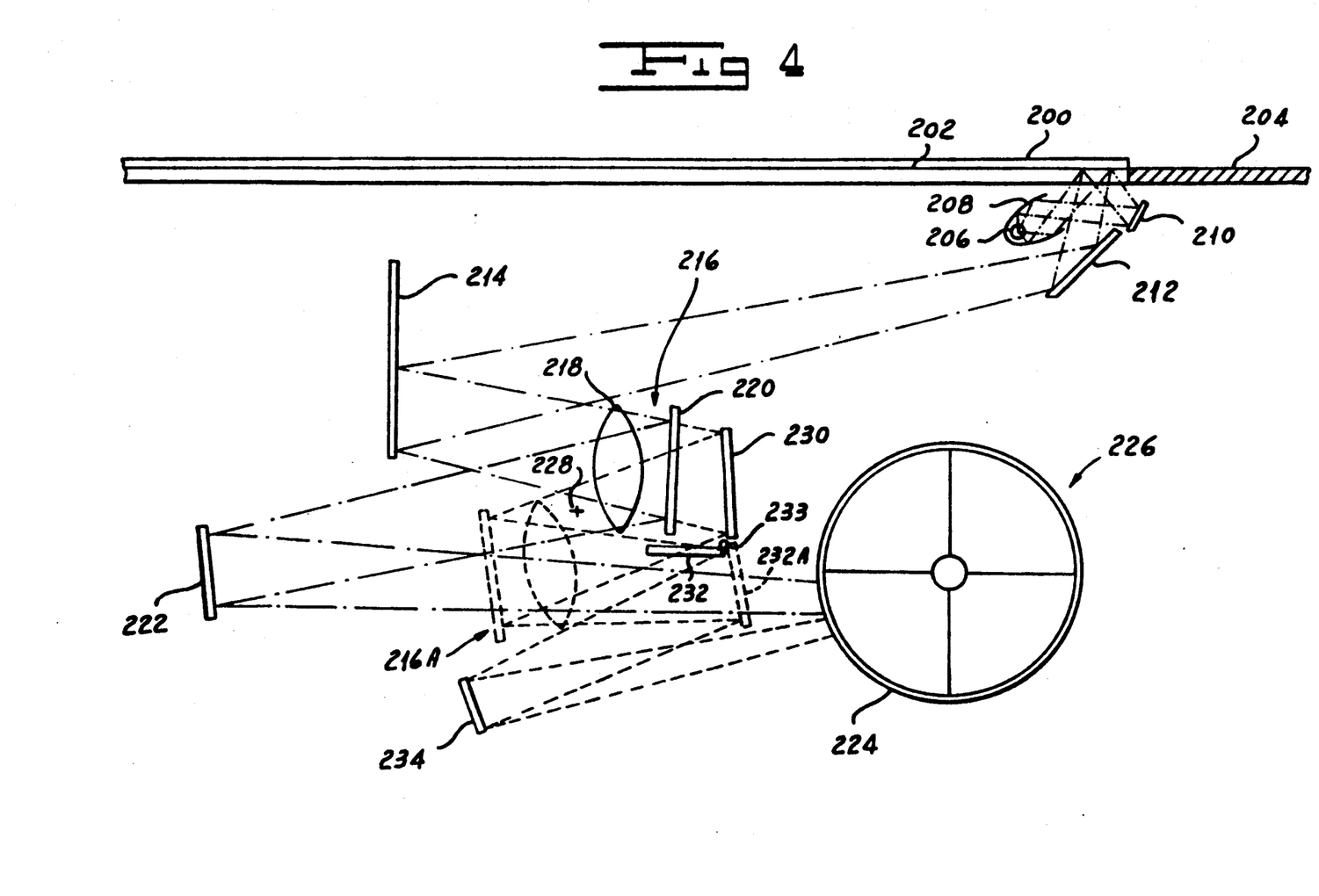
FIG. 4 is a side elevation of a second embodiment of my invention showing the optical paths for various magnifications.
Figure 5:
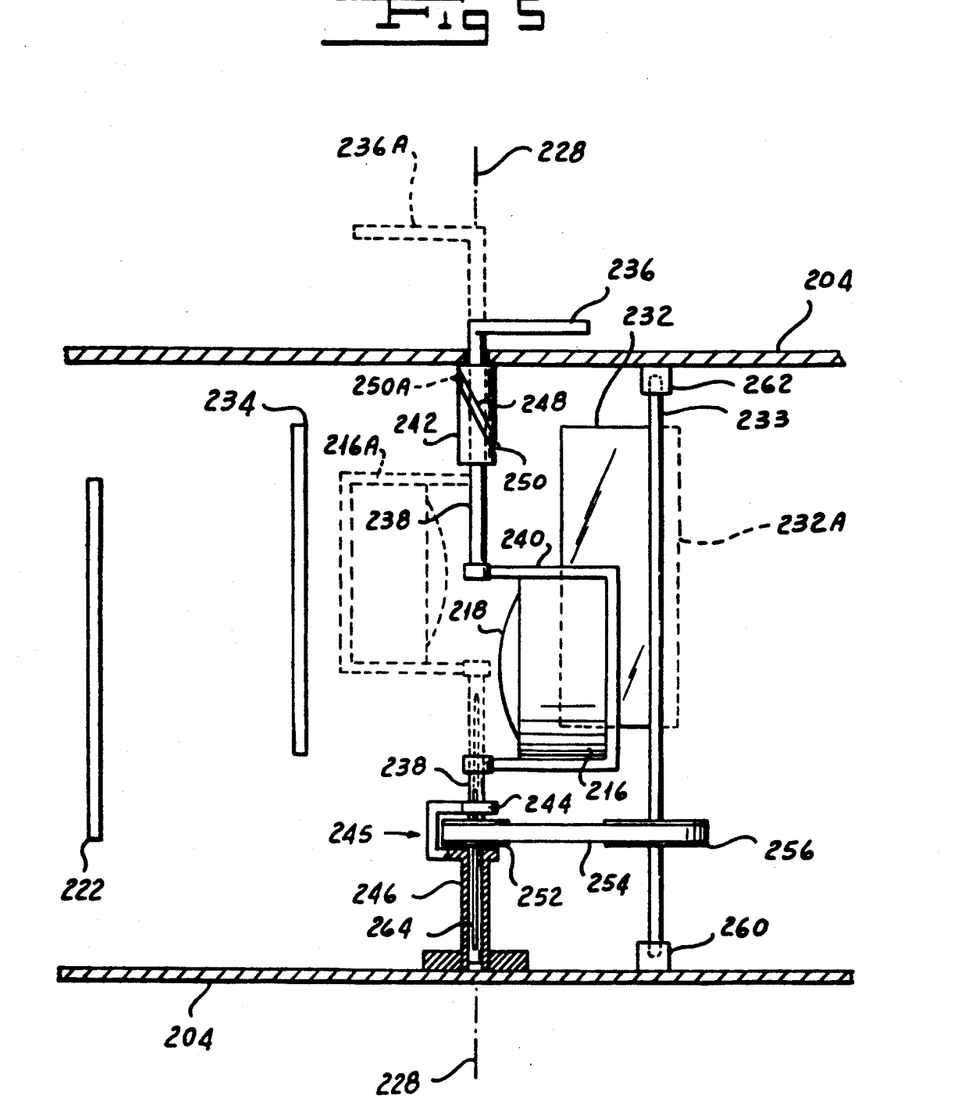
FIG. 5 is a fragmentary plan view of the second embodiment showing the details of mechanism for driving the various optical elements.

FIGS. 4 and 5 show an alternate embodiment of my invention. Document 200 to be copied is placed upon transparent platen 202 mounted in the top of housing 204 of an electrophotographic copier. Light from lamp 206 is reflected from reflector 208 and mirror 210 to illuminate a narrow strip of document 200. Light from this illuminated strip is directed to reflex lens 216 after sequential reflection from transfer optics comprising full-rate scanning mirror 212 and half-rate mirror 214. Reflex lens 216 is of fixed focal length and comprises lens 218 and mirror 220, both mounted to rotate as a unit about the axis 228 of a shaft 238 (FIG. 5). Light from lens 216 is focused upon the photoconductive surface 224 of drum 226 after reflection from transfer optic comprising mirror 222 to produce an image the magnification of which is unity, for example.

If a reduced magnification is desired, reflex lens 216 is rotated about axis 228 to the position 216A. Since the rotational axis 228 is orthogonal to, but appreciably displaced from, the optical axis of reflex lens 216, there results an appreciable displacement of the optical center of lens 216.

The rotation of reflex lens 216 to the position 216A unmasks a mirror 230; and light from half-rate mirror 214 passes to lens 216A only after reflection from mirror 230. This increases the object distance. Light from lens 216A is now focused on photoconductive surface 224 after sequential reflection from mirrors 232A and 234. Mirror 232 is mounted on a rotatable shaft 233. For unity magnification, mirror 232 is in the position shown where it does not intercept the light path from mirror 222 to photoconductive surface 224. For reduced magnification, mirror 232 is rotated by shaft 233 to the alternate position 232A. The increased ratio of object distance to image distance reduces the magnification while maintaining a properly focused image.

FIG. 5 shows a mechanism for moving the optical elements 216 and 232 of FIG. 4 to change the magnification. By moving magnification-changing crank handle 236 from the position shown to the alternate position 236A, shaft 238 is rotated. Shaft 238 comprises two sections disposed on either side of an eccentric or yoke 240 on which reflex lens 216 is mounted. The two sections of shaft 238 are coaxial with rotational axis 228. Shaft 238 is mounted for both rotation and translation by bearings 242 and 246. Bearing 242 is formed with a helical cam slot 248 in which rides a pin 250 mounted in the upper section of shaft 238. As shaft 238 is rotated clockwise from above by crank 236, pin 250 moves upwardly in cam slot 248, thus moving shaft 238 upwardly. When crank 236 is moved to the position 236A, pin 250 will be moved to position 250A. Hence yoke 240 will not only be rotated approximately 180° about axis 228, but it will also be shifted upwardly. It will be understood that upward movement in the plan view of FIG. 5 actually represents horizontal movement. This horizontal movement causes images produced at reduced magnification to have a common margin with images produced at unity magnification. This shifting of the reflex lens perpendicular to its optical axis to achieve a common margin at various magnifications may also be applied in the first embodiment of my invention.

Pulley 252 is mounted on the lower section of shaft 238 inboard of bearing 246. The lower section of shaft 238 is provided with an elongated slot 264; and pulley 252 is provided with a pin or key (not shown) which rides in slot 264. Thus rotational movement of shaft 238 causes rotational movement of pulley 252; but translational movement of shaft 238 relative to pulley 252 is accommodated. Secured to bearing 246 is an arm 245 which mounts a keeper or thrust bearing 244 preventing axial motion of pulley 252.

Flexible belt 254 couples pulley 252 to another pulley 256, which is mounted on shaft 233. Shaft 233 is rotatably supported by bearings 260 and 262. Thus rotation of crank 236 rotates shaft 233 and mirror 232 which is secured thereto. Pulley 256 is nearly twice the diameter of pulley 252 since the rotation of mirror 232 for a change of magnification is only slightly greater than 90°.

The ends of cam slot 248 serve as stops accurately to fix the positions of yoke 240, and hence mirror 232, for each magnification. Gravity acting on the eccentrically mounted reflex lens 216 biases pin 250 against the inboard end of slot 248 in the position shown In the alternate position, gravity biases pin 250A against the outboard end of slot 248.

Figure 6:
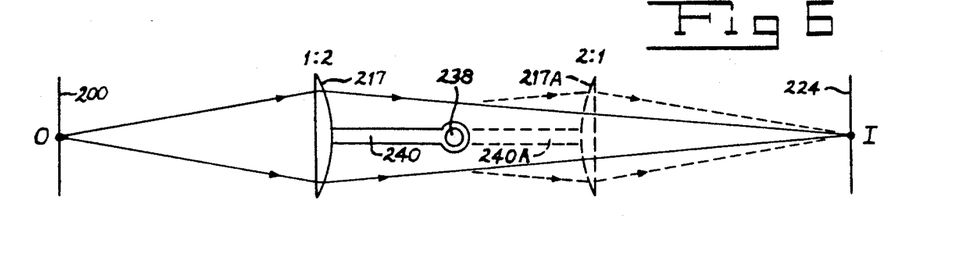
FIG. 6 is a diagrammatic side view of an embodiment similar to FIG. 5 wherein focusing is provided by a lens.

FIG. 6 is similar to the embodiment of FIG. 5, but focusing is provided by a plano-convex lens 217. The object 0 may be original document 200. The image I may be photoconductive surface 224. Yoke 240 supports lens 217 for rotation on shaft 238. Shaft 238 may be translated along its axis 228. The focal length of lens 217 may be 1.5 inches, for example; and the total distance between object 0 and image I may be 6.75 inches. In the position shown, the magnification of the image is two; and the distance of the object 0 from lens 217 is 2.25 inches while the distance of the image I from lens 217 is 4.5 inches. Shaft 238 is positioned 3.375 inches distant from both the object 0 and the image I. The length of the arm of yoke 240 is 1.125 inches. Rotation of shaft 238 through 180° rotates yoke 240A and lens 217A to the positions shown in broken lines. The magnification of the image is one-half; and the object distance is now 4.5 inches while the image distance is now 2.25 inches.

Small errors in the locations of the angular limit stops adjacent the 0° and 180° points produce negligible errors in either the focusing or the magnification of the image. These depend upon the distances along the line between object and image and hence upon the cosine of the rotation angle. At 0° the cosine is +1; and at 180° the cosine is −1. The cosine is insensitive to small angular errors adjacent 0° and 180°. For example, the cosine of 0.8° is 0.99990; and the error from +1 is 0.00010. Thus for a yoke arm length of 1.125 inches, an angular error of as much as ±0.8° in the location of the 0° limit stop results in an error in the object and image distances of only 0.11 mil.

In rotating from the position shown to the alternate position, lens 217-217A not only moves 2.25 inches to the right along the O - I axis, but also is flipped over so that its more plano surface is associated with the shorter of the object and image distances, while its more convex surface is associated with the larger of the object and image distances. Lens 217 has a shape factor which is negative, while the very same lens 217A has a shape factor which is positive because of its 180° rotation. The magnitude of the shape factor is such as to reduce spherical aberration to a minimum. This bending of the lens insures that a marginal ray enters the left-hand lens surface and leaves the right-hand lens surface at substantially equal angles so that there is nearly equal refraction at both surfaces. If lens 217 were merely translated to the right, there would be no reversal of its shape factor; and spherical aberration would be very large for an image magnification of one-half. The rotation of lens 217-217A through 180° insures that spherical aberration is a minimum at both image magnifications.

It will be seen that I have accomplished the objects of my invention. I have provided a variable magnification electrophotographic copier wherein the focusing means rotates about an axis orthogonal to its optical axis. The rotational axis may substantially intersect the optical axis as in FIG. 1 or may be appreciably displaced from the optical axis as in FIG. 4. Since no translation of the focusing means along its optical axis is needed, the construction is simple and inexpensive while providing accurate focusing at various magnifications.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. An electrophotographic copying apparatus, comprising:
   a photoconductive surface;
   means for receiving an object;
   a lens for focusing said object onto said photoconductive surface, said lens having an optical axis and first and second refractive surfaces;
   means for defining a first discrete angular position of said focusing means such that said focusing means focuses said object on said photoconductive surface at a first magnification;
   means for defining a second discrete angular position of said focusing means such that said focusing means focuses aid object on said photoconductive surface at a second magnification; and
   means for reversibly rotating said focusing means between said first and second discrete angular positions about an optical axis that is perpendicular to said optical axis, said rotating means causing said first refractive surface to face said photoconductive surface in said first discrete angular position and said second refractive surface to face said photoconductive surface in said second discrete angular position, the orientation of said refractive surfaces relative to said photoconductive surface being determined with respect to light traveling from said object to said photoconductive surface.

2. An electrophotographic copying apparatus as claimed in claim 1, wherein said first and second refractive surfaces have different curvatures.

3. An electrophotographic copying apparatus as claimed in claim 2, wherein said lens has a shape factor such that spherical aberration is minimized at said first and second magnifications.

4. An electrophotographic copying apparatus as claimed in claim 1, wherein said rotating means rotates said lens through substantially 180° about said axis of rotation.

5. An electrophotographic copying apparatus, comprising:
   a photoconductive surface;
   means for receiving an object;
   means or focusing said object onto said photoconductive surface, said focusing means comprising an optical axis;
   means for defining a first discrete angular position of said focusing means such that said focusing means focuses said object on said photoconductive surface at a first magnification;
   means for defining a second discrete angular position of said focusing means such that said focusing means focuses said object onto said photoconductive surface at a second magnification;
   means for defining a first position for transfer optics for transferring light from said object to said photoconductive surface by way of said focusing means at a said first magnification;
   means for defining a second position for transfer optics for transferring light from said object to said photoconductive surface by way of said focusing means at said second magnification;
   means for rotating said focusing means between said first and second discrete angular positions around an axis of rotation that is substantially perpendicular to said optical axis;
   means for changing between said first and second positions of said transfer optics; and
   means for linking said rotating means and said changing means so that said rotating means and said changing means provide said electrophotographic copying machine with said first and second magnifications wherein said linking means comprises a mechanical coupling for simultaneously moving said rotating means between said first and second discrete angular positions, and said changing means between said first and second positions, respectively, and wherein said rotating means further comprises means for moving said focusing means along said axis of rotation between said first and second discrete angular positions.

6. An electrophotographic copying apparatus, comprising:
   a photoconductive surface;
   means for receiving an object;
   means for focusing said object onto said photoconductive surface, said focusing means comprising an optical axis;
   means for defining a first discrete angular position of said focusing means such that said focusing means focuses said object on said photoconductive surface at a first magnification;
   means for defining a second discrete angular position of said focusing means such that said focusing means focuses said object onto said photoconductive surface at a second magnification;
   means for defining a first position for transfer optics for transferring light from said object to said photoconductive surface by way of said focusing means at a said first magnification;

means for defining a second position for transfer optics for transferring light from said object to said photoconductive surface by way of said focusing means at said second magnification;

means for rotating said focusing means between said first and second discrete angular positions around an axis of rotation that is substantially perpendicular to said optical axis;

means for changing between said first and second positions of said transfer optics; and means for linking said rotating means and said changing means so that said rotating means and said changing means provide said electrophotographic copying machine with said first and second magnifications wherein said rotating means rotates said focusing means through substantially 180° around said axis of rotation between said first and second discrete angular positions.

7. An electrophotographic copying apparatus, comprising:

a photoconductive surface;

means for receiving an object;

means or focusing said object onto said photoconductive surface, said focusing means comprising an optical axis;

means for defining a first discrete angular position of said focusing means such that said focusing means focuses said object on said photoconductive surface at a first magnification;

means for defining a second discrete angular position of said focusing means such that said focusing means focuses said object onto said photoconductive surface at a second magnification;

means for defining a first position for transfer optics for transferring light from said object to said photoconductive surface by way of said focusing means at a said first magnification;

means for defining a second position for transfer optics for transferring light from said object to said photoconductive surface by way of said focusing means at said second magnification;

means for rotating said focusing means between said first and second discrete angular positions around an axis of rotation that is substantially perpendicular to said optical axis;

means for changing between said first and second positions of said transfer optics; and means for linking said rotating means and said changing means provide said electrophotographic copying machine with said first and second magnifications wherein said means for defining said first or second discrete angular positions comprises at least one limit stop.

8. An electrophotographic copying apparatus, comprising:

a photoconductive surface;

means for receiving an object;

means for focusing said object onto said photoconductive surface, said focusing means comprising an optical axis;

means for defining a first discrete angular position of said focusing means such that said focusing means focuses said object on said photoconductive surface at a first magnification;

means for defining a second discrete angular position of said focusing means such that said focusing means focuses said object onto said photoconductive surface at a second magnification;

means for defining a first position for transfer optics for transferring light from said object to said photoconductive surface by way of said focusing means at a said first magnification;

means for defining a second position for transfer optics for transferring light from said object to said photoconductive surface by way of said focusing means at said second magnification;

means for rotating said focusing means between said first and second discrete angular positions around an axis of rotation that is substantially perpendicular to said optical axis;

means for changing between said first and second positions of said transfer optics; and means for linking said rotating means and said changing means so that said rotating means and said changing means provide said electrophotographic copying machine with said first and second magnifications wherein said axis of rotation and said optical axis substantially intersect.

9. An electrophotographic copying apparatus, comprising:

a photoconductive surface;

means for receiving an object;

means for focusing said object onto said photoconductive surface, said focusing means comprising an optical axis;

means for defining a first discrete angular position of said focusing means such that said focusing means focuses said object on said photoconductive surface at a first magnification;

means for defining a second discrete angular position of said focusing means such that said focusing means focuses said object onto said photoconductive surface at a second magnification;

means for defining a first position for transfer optics for transferring light from said object to said photoconductive surface by way of said focusing means at a said first magnification;

means for defining a second position for transfer optics for transferring light from said object to said photoconductive surface by way of said focusing means at said second magnification;

means for rotating said focusing means between said first and second discrete angular positions around an axis of rotation that is substantially perpendicular to said optical axis;

means for changing between said first and second positions of said transfer optics; and means for linking said rotating means and said changing means so that said rotating means and said changing means provide said electrophotographic copying machine with said first and second magnifications wherein said axis of rotation intersects said focusing means.

10. An electrophotographic copying apparatus, comprising:

a photoconductive surface;

means for receiving an object;

means for focusing said object onto said photoconductive surface, said focusing means comprising an optical axis;

means for defining a first discrete angular position of said focusing means such that said focusing means focuses said object on said photoconductive surface at a first magnification;

means for defining a second discrete angular position of said focusing means such that said focusing means focuses said object onto said photoconductive surface at a second magnification;

means for defining a first position for transfer optics for transferring light from said object to said photoconductive surface by way of said focusing means at a said first magnification;

means for defining a second position for transfer optics for transferring light form said object to said photoconductive surface by way of said focusing means at said second magnification;

means for rotating said focusing means between said first and second discrete angular positions around an axis of rotation that is substantially perpendicular to said optical axis;

means for changing between said first and second positions of said transfer optics; and means for linking said rotating means and said changing means so that said rotating means and said changing means provide said electrographic copying machine with said first and second magnifications, wherein said focusing means:

comprises a lens having a first and second refractive surfaces, and said rotating means reverses said lens between said first and second discrete angular positions so that said first refractive surface faces said photoconductive surface in said first discrete angular position and said second refractive surface faces said photoconductive surface in said second discrete angular position, said facing of said refractive surfaces relative to said photoconductive surface being determined with respect to light traveling from said object to said photoconductive surface.

* * * * *

UNITED STATES PATENT AND TRADEMARK OFFICE
CERTIFICATE OF CORRECTION

PATENT NO. : 5,146,276
DATED : Sept 8, 1992
INVENTOR(S) : Benzion Landa

It is certified that error appears in the above-indentified patent and that said Letters Patent is hereby corrected as shown below:

| Column | Line | |
|--------|------|---|
| 1 | 9 | After "1980" insert --, now abandoned,--. |
| 6 | 30 | After "shown" insert --.--. |
| 7 | 50 | Change "aid" to --said--. |
| 8 | 11 | Change "or" to --for--. |
| 9 | 23 | Change "or" to --for--. |
| 9 | 49 | After "means" insert --so that said rotating means and said changing means--. |
| 11 | 9 | Change "form" to --from--. |

Signed and Sealed this

Fourth Day of January, 1994

BRUCE LEHMAN

*Attest:*

*Attesting Officer*  *Commissioner of Patents and Trademarks*